Figure 1:
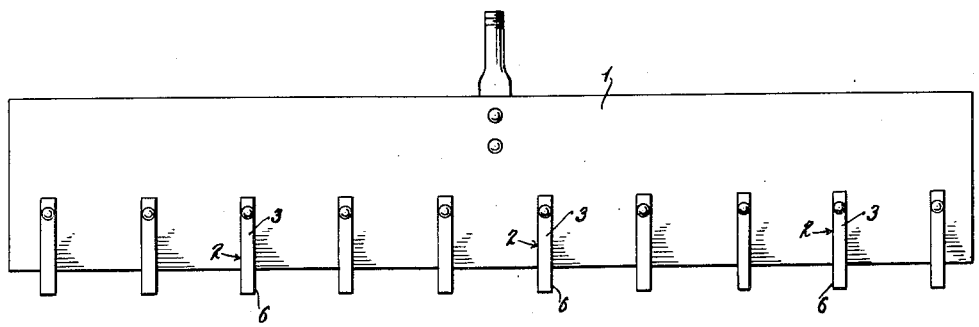

Aug. 16, 1932.  J. P. McHALE  1,872,601

ROAD SCRAPING OR GRADING APPARATUS

Filed Jan. 24, 1929

Inventor
John P. McHale

By Bacon & Thomas
Attorneys

Patented Aug. 16, 1932

1,872,601

UNITED STATES PATENT OFFICE

JOHN P. McHALE, OF DORMONT, PENNSYLVANIA

ROAD SCRAPING OR GRADING APPARATUS

Application filed January 24, 1929. Serial No. 334,718.

This invention relates to a road scraping or grading apparatus.

The primary object of the invention is to provide a novel form of tooth or set of teeth which are attachable to a plate of a bulldozer, road grader or the like, which teeth perform the office of cutting the surface being treated to a limited extent as the edge of the plate pushes the soil along in front of the bulldozer in one operation as distinguished from the type of apparatus in which one instrumentality is utilized to first cut the raised portions of the soil and another instrumentality used to grade the same.

Particularly the invention comprehends a novel form of tooth having a tapered shank, a recess for receiving the edge of the grader or the like, and a rearwardly extending finger engaging the rear portion of the plate, the tooth having a tapered cutting edge for the purpose aforesaid.

Other objects of the invention will be apparent to those skilled in the art from a reading of the following specification in conjunction with the drawing attached hereto and forming a part hereof, in which—

Figure 2:
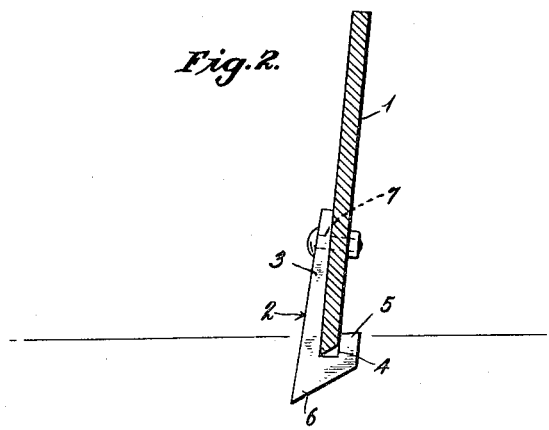

Figure 1 is an elevational view of a road scraping or grading blade with a set of teeth attached thereto, and Figure 2 is a vertical sectional view of the structure shown in Figure 1.

Referring now particularly to the drawing, I have shown in a diagrammatic manner a vertically flat disposed scraper having a lower beveled cutting edge to which my invention is applied. This is indicated by reference numeral 1. Obviously this may be a cutting edge provided by a bulldozer, road grading machine or the like. To this scraping blade 1 I attach a suitable number of steel teeth as for instance, ten. These teeth are indicated by reference numeral 2 and, as will be observed, the shanks 3 thereof are provided with a tapering cut at the rear thereof which engages the front face of the cutting blades. There is also provided a recess 4 for receiving the edge of the cutting blade and an upwardly extending rear finger 5 engaging the rear face of the cutting blade. The beveled teeth 6 of the tooth extend approximately two or more inches downwardly below the edge of the cutting blade for the purpose hereinafter to be described. These teeth are attachable to the blade by means of suitable fastening devices extending through apertures 7 thereof as shown in the drawing.

It will be observed that these cutting teeth attached to the cutting blade as aforesaid serve to cut within the soil a distance of several inches as the lower cutting edge of the plate pushes the soil along in front thereof to grade it and in case of any depressions in the surface of the ground the loose soil is dropped in these depressions. Where there are elevations the teeth cut the surface thereof and continue to carry the loosened soil until either deposited in a heap or dropped into depressions in the surface being treated. By virtue of this arrangement the teeth dig into the soil and permit the bulldozer to scrape or dig a few inches and cut off a certain area without necessitating the plowing or loosening of the ground by a preliminary operation. The cutting and grading is performed in one operation. Obviously a machine of this character is particularly adapted for use in grading roads and general landscape work. The particular construction of the teeth is of importance in order that a durable structure may be obtained. Obviously the tooth is prevented from straining the fastening device because of engagement with the cutting blade in the recess thereof, which recess permits lateral or vertical relative displacement of the tooth and the cutter.

Having thus described my invention, what I claim is:

In combination, a flat grading plate having a lower beveled cutting edge, and a plurality of teeth attached to said plate, said teeth each including a rearwardly beveled cutting point, a shank extending upwardly from the front of the point to flatly engage the front face of said plate, a finger extending upwardly from the rear of the point in spaced relation to the shank to flatly engage the rear face of the plate, and securing means passing through the plate and the upper end portion only of the shank.

In testimony whereof I affix my signature.

JOHN P. McHALE.